US005080840A

United States Patent [19]

Jost et al.

[11] Patent Number: 5,080,840

[45] Date of Patent: Jan. 14, 1992

[54] METHOD AND APPARATUS FOR THE MANUFACTURE OF ROOF COVERING PLATES HAVING A TRANSVERSE FLANGE

[75] Inventors: Gunter Jost, Rodgau; Manfred Weisweiler, Dreieichenhain, both of Fed. Rep. of Germany

[73] Assignee: Braas GmbH, Oberursel, Fed. Rep. of Germany

[21] Appl. No.: 327,982

[22] Filed: May 23, 1990

[51] Int. Cl.[5] ........ B29C 39/04; B29C 39/30

[52] U.S. Cl. ........ 264/40.1; 264/40.7; 264/145; 264/256; 425/134; 425/135; 425/253; 425/308; 425/431; 425/436 R

[58] Field of Search ........ 264/255, 256, 145, 40.1, 264/40.7; 425/134, 135, 308, 310, 436, 431, 456, 469, 253; 52/518, 598, 609

[56] References Cited

U.S. PATENT DOCUMENTS

| | | | |
|---|---|---|---|
| 430,366 | 6/1890 | Babcock | 52/542 |
| 730,131 | 6/1903 | Klay | 52/542 |
| 1,792,844 | 2/1931 | Knecht | 425/134 |
| 2,965,949 | 12/1960 | Lang | 425/134 |
| 3,193,903 | 7/1965 | White | 425/134 |
| 3,220,150 | 11/1965 | Besse | 52/542 |
| 3,303,245 | 2/1967 | Trudeau | 264/256 |
| 3,583,117 | 6/1971 | Roach | 52/542 |
| 4,131,670 | 12/1978 | Abate | 264/256 |
| 4,145,860 | 3/1979 | Wotherspoon | 428/15 |
| 4,789,313 | 12/1988 | Garcia | 425/134 |

FOREIGN PATENT DOCUMENTS

| | | | |
|---|---|---|---|
| 8303632 | 10/1983 | European Pat. Off. | 52/518 |
| 270524 | 12/1908 | Fed. Rep. of Germany . | |
| 228197 | 11/1910 | Fed. Rep. of Germany . | |
| 2508551 | 3/1076 | Fed. Rep. of Germany . | |
| 1102029 | 3/1961 | Fed. Rep. of Germany . | |
| 2647509 | 4/1977 | Fed. Rep. of Germany . | |
| 2101954 | 3/1972 | France . | |
| 666649 | 2/1952 | United Kingdom . | |

*Primary Examiner*—Willard Hoag
*Attorney, Agent, or Firm*—Morgan & Finnegan

[57] ABSTRACT

An apparatus and a proces for the manufacture, by the extrusion method, of roof covering plates having at their underside a transverse flange shaped thereto. At a filling station cavities in the pallets corresponding to the transverse flange, are first filled with a hardenable plastic material such as fresh concrete, and said material is then compacted at at least one compacting station. Thereafter, a continuous layer of the material is deposited at a depositing station. The material is finally processed to roof covering plates.

18 Claims, 8 Drawing Sheets

METHOD AND APPARATUS FOR THE MANUFACTURE OF ROOF COVERING PLATES HAVING A TRANSVERSE FLANGE

This invention belongs to the technical field of roofing materials. It is in particular related to a method for the manufacture of roof covering plates comprising at their underside, integrally formed thereto, a transverse flange.

Such roof covering plates or roofing plates may have the shape of pent roof terminal plates or tiles, gutter tiles, terminal bonnet tiles or similar.

Furthermore, the invention is related to an apparatus for the manufacture of such roof covering plates, and also to the roof covering plates having a transverse underside flange obtained by the new method.

The method of manufacture can be applied to the manufacture of plane tiles as well as of profiled tiles, all having a transverse underside flange shaped integrally thereto. The tiles may consist of any material adapted thereto such as concrete, ceramic masses and comparable artificial stone materials.

In the following, the invention shall specifically be described with reference to profiled pent roof terminal plates of concrete without limiting the invention thereto.

In particular, the invention is concerned with a method for the manufacture of roof covering plates having at their underside a transverse flange integrally shaped thereto, comprising applying a continuous layer of a hardenable plastic material on pallets which each comprise a cavity for the shaping of said transverse flange and which are fed in a continuous row to a depositing station, said layer being subsequently compacted by means of a shaping roller and slipper, a separate compacting being made in said cavities, and optionally profiled, the compacted layer being then cut to roof covering plates at a cutting station, the cut plates finally being hardened at normal or elevated temperature and removed from the pallets.

The apparatus of this invention for the manufacture of roofing plates having an underside transverse flange shaped thereto, comprises a depositing station adapted for being supplied with a hardenable plastic material to form a continuous material layer on a continuous row of displaceable pallets driven by a conveyor, said pallets each having a cavity for the shaping of said transverse flange, furthermore comprises a compacting station for the compacting of the material within the said cavities, as well as a shaping roller and a slipper for the compacting and, optionally, the profiling of the continuously moving material layer on the pallets, and furthermore a cutting station for cutting the continuous, compacted material layer into individual moulded roofing plate pieces.

In the specification, the term "plastic material" refers to a plastically deformable mass such as fresh, wet concrete.

Concrete roofing plates or tiles are currently manufactured by an extrusion process, such as the one described in German Patent Specification no. 22 52 047 and the published German Patent Application no. 35 22 846. According to these publications, a continuous layer of fresh concrete is applied onto a continuous row of pallets which are supplied to a depositing station, said layer being then compacted and optionally profiled by a shaping roller and a slipper. The layer is then cut at a cutting station into roofing plates of equal length which are then dried and hardened in a drying station. The principal process stations are stationary, thus reducing the wear and guaranteeing a high dimensional accuracy of the finished concrete roofing plates. This extrusion process can be carried out continuously and permits a high production rate.

In such a continuous extrusion process , it is in principal difficult to shape greater parts of material, which are extending transversely to the travelling direction of the pallets, integrally to the roofing plates. Such transverse portions are, for example, the so-called flanges of a terminal pent roof plate or a gutter tile as well as the end flange of terminal bonnet tiles. Furthermore, roofing plates for especially steep roofs require transversal fixing flanges of greater length. All these transverse parts such as wings, flanges, ridges, webs etc. are termed in the following as transverse flange. In the continuously working extrusion processes, it is difficult to fill the cavities provided for these transverse flanges in the pallets, in the time period available, sufficiently with the plastic material and to compact it. Problems are encountered with the compacting in greater cavities and, especially, in their lower portions.

An apparatus of that kind is known from U.S. patent specification No. 3,122,812. In this known apparatus, the filling of the cavities in the pallets provided for the transverse flange, and the deposition of a continuous fresh concrete layer on the pallets are operated simultaneously when the pallets travel through a depositing station. The fresh concrete falls down, driven by its own weight, from a filling funnel also into the cavities of the pallets and is compacted on passing a shaping roller. When a long transverse flange is to be formed, a separate compacting is provided in the interior of the cavities. To obtain this, an elongated compacting tool aligned transversely to the travel direction of the pallets, is introduced into the cavity through the continuous fresh concrete layer on the pallets and should compact the fresh concrete in the cavities.

That process is a continuous extrusion process where it is difficult, as already stated, to fill the caivties for the transverse flanges with a sufficient amount of plastic material within the time period available and to compact it therein.

European patent specification no. 0,037,614 discloses an apparatus comprising a stationary arrangement of a plurality of pallets wherein a displaceable depositing and cutting station is moved over the pallets for depositing and compacting a continuous layer of fresh concrete. The displaceable depositing and cutting stations will then be reversed stepwise, and the continuous layer of concrete is cut into individual mouldings. Subsequently, the pallets are removed together with the mouldings from the apparatus for drying.

It is obvious that such a process is time consuming. Furthermore, the cavities are also filled simultaneously with the deposit of the continuous fresh concrete layer. The known suggestion does not provide either any special means for compacting the concrete within the cavities.

Now, the major object of this invention, compared with the known methods and apparatuses described above for the manufacture of roofing plates comprising a transverse flange formed together with the plates, is to provide extruded roofing plates comprising a transverse flange having a satisfactory compacting and a high strength throughout the whole flange. Particularly, the lower portions of the transverse flange should get a corresponding strength and dimensional stability by applying a sufficient compacting, especially with transverse flanges of greater length.

Another object of the invention is the manufacture of roofing plates having at their underside a transverse flange, integrally shaped thereto, by an unique apparatus which permits the production of such roofing plates having different lengths of the transverse flange, without substantial transformations.

In a process as defined above, the invention is characterized by the fact that a predeterminated amount of plastic material is introduced, at a filling depositing station, into the cavity of the incoming pallet, that this plastic material is compacted in at least one compacting station, and that the continuous material layer is deposited subsequently at a depositing station.

It will be understood that, in the process of the invention, the filling of the pallet cavity with plastic material to form the transverse flange, on one hand, and the deposit of the continuous material layer on the pallets, on the other hand, are separated in time and space.

Only after the cavity has been filled with plastic material and the latter has been sufficiently compacted, the whole pallet is layered, the region of the cavity included, with the continuous mass of material, this layer being subsequently compacted and optionally profiled by the shaping roller and the slipper in the conventional manner.

In a preferred embodiment of the process of this invention, at least two different measures are provided to compact the plastic material within the cavity. At a first compacting station, the plastic material in the lower corners of the cavity is compacted, and the remainder of the material in the cavity is then compacted at a second compacting station.

It is preferred to overfill the cavity at the filling station in order to cope for the reduction of the material volume during the subsequent compacting. Tests have shown that during compacting, part of the material deposited over the cavity and also part of the material introduced into the cavity, is displaced on the pallet beside the cavity. In order to completely fill the cavity after the first compacting, the material displaced on the surface of the pallet is transferred into the cavity by a scraper or stripper device prior to the second compacting.

It has been found that any material having an elevated viscosity such as fresh concrete or similar, can be compacted within the cavities until a certain depth only, so that in pallets having deeper cavities, after the compacting of the material in the corners of the cavities, a sole compacting of the remainder of the material will not be sufficient to obtain the necessary strength and pore density of the whole lower region of the transverse flange. Therefore, a pre-compacting of the remaining material of the cavity may be foreseen at an additional compacting station when the material in the lower corners of the cavity has been compacted, and when pallets are used having deeper cavities.

It will then be advantageous when material which has been deposited on the pallets beside the cavities, is transferred into the cavities by a further, additional scraper device.

According to a further aspect of the process of the invention, it is possible to produce roofing plates having different lengths of their transverse flange. For this purpose, pallets having corresponding cavities are used and one or more detectors are provided to sense the size of the respective cavities, and a corresponding determined amount of plastic material is introduced into the cavities responsive to the detector signal.

The process of the invention thus requires primarily modifications in the inlet zone of a conventional production line for the manufacture of roofing plates by extrusion, e.g. of concrete, prior to the depositing station, and, of course, the use of pallets having corresponding cavities to form the transverse flange. Therefore, the invention contemplates, as to these modifications, at least the following ones: the pallets are first supplied to a filling station where a predetermined amount of plastic material is introduced into the cavity of each pallet, then the pallets pass through at least one compacting station wherein at least one compacting tool, adapted to the travel speed of the pallets, is introduced into the cavity of the respective pallet and removed therefrom, in order to obtain the compacting of the material within the cavity, and the pallets are then supplied to the depositing station where a continuous material layer is deposited onto the pallets.

In addition to the already known stations of a production line for the manufacture of roofing plates by extrusion, the apparatus of the invention comprises a filling station and at least one compacting station for compacting the plastic material. The remaining working stations of the apparatus of the invention may be constructed and arranged according to DE-C-22 52 047 or DE-A-35 22 846.

A rotatable multiple-wing star feeder is preferably attached to the filling station which will introduce, by stepwise rotation, a predetermined amount of plastic material into the cavity of each supplied pallet.

Downstream to the filling station, a first compacting station is provided, comprising two compacting ,tools which are arranged such that they compact the plastic material in the lower corners of the cavity during their motion towards the inside of the cavity.

It is preferred that each compacting tool comprises a pusher which is connected in angular or bent-off relationship with a leg whose free end is rotatably fixed to the compacting station. This pusher can be moved according to a circular path into a lower corner of said cavity.

It has been found during practical test of the invention that this first compacting station substantially contributes to the improvement of strength and dimension stability of the transverse flange shaped to the underside of the plates.

According to a preferred embodiment of the invention, the said free ends of the legs of the compacting tools may be mounted at different levels in the compacting station. This fact guarantees that the compacting tools can compact the plastic material in the corners of differently deep cavities.

The invention further contemplates a second compacting station downstream the first one. The second compacting station comprises an elongated compacting tool aligned transversely to the direction of travel of the pallets which has nearly the same sectional area as that of the cavity so that a compacting of the whole material in the cavity can be achieved.

A scraper or stripper device may be provided ahead of the second compacting station. The edges of the stripper are essentially aligned with the upper surface of the pallets. This device achieves the re-filling of the cavities with plastic material before they pass to the second compacting station.

The apparatus of the invention preferably comprises an additional compacting station which is positioned between the first compacting station and the stripper device, seen in travel direction of the pallets. This compacting device acts as a precompactor and will only be activated when a pallet passes having a deeper cavity, adapted to produce a roofing plate having a transverse flange of greater length. This precompacting device also comprises an elongated compacting tool disposed transversely to the travelling direction of the pallets, in the same manner as the first compacting station, and which fills out substantially the whole section of the cavity.

Actuating mechanisms for the compacting tools are preferably pneumatic or hydraulic piston-cylinder units.

When the additional compacting station is used which is positioned ahead of the cited stripper device and the second compacting station, it is advantageous to provide a further stripper device ahead of the additional compacting station, to align the stripping edges essentially with the upper surface of the pallets. This guarantees the refilling of the cavities of the pallets before they enter the additional compacting station.

According to another object of the present invention, the apparatus of the invention should be able to produce roofing plates having transverse flanges of different lengths. For this purpose, the continuous row of pallets contains pallets which differ from others by the size of their cavities.

In order to manufacture roofing plates having transverse flanges of different lengths in the apparatus of the invention without the necessity of substantial transformations, at least one detector is placed adjacent the conveyor path of the pallets in order to detect the size of the cavity of each pallet and to supply generated detector signals to the filling station and to one or more compacting stations. The detector signals are used to control the amount of plastic material to be introduced into the cavity of the corresponding pallet at the filling station. For example, the above-mentioned star feeder will rotate, responsive to said detector signal, by one or more angular steps depending on whether the pallet has a smaller or a greater cavity. The detector signals furthermore serve to adjust the correct height position of the free leg ends of the compacting tools at the first compacting station in order that the pusher of these compacting tools can advance to the lower corner region of the corresponding pallet cavity. Finally, the detector signals serve to actuate, if appropriate, the additional compacting station when a pallet having a deeper cavity is fed thereto.

Preferably, the conveyor device is adapted for a stepwise advancing motion of the pallets and comprises a reversibly acting pneumatic or hydraulic piston-cylinder device which acts on an advance traveller engaging the pallets to displace it along a certain distance in advancing direction. Such a conveyor device is known from German Offenlegungsschrift (published patent application) no. 29 45 553. This document is incorporated herein by reference as far as it contributes to the understanding of the present invention.

With such a stepwise, intermittent motion of the pallet row, it is advantageous that the filling and compacting stations are stationary, and that the operations of these stations are accomplished during the standstill times of the pallets in the course of their stepwise advance.

The method of this invention can be applied to the production of plane as well as of profiled roofing plates, all of them being provided at their underside with a transverse flange. Preferred is the manufacture of pent roof terminal plates, gutter plates, and terminal bonnet plates. For the production of profiled roofing plates, pallets having a corresponding negative profile must be used, and appropriately adapted stripper devices, shaping rollers and slippers will be necessary.

The process can easily be adapted to the different materials known for the manufacture of roofing plates. It is particularly suited for the manufacture of roofing plates of concrete.

BRIEF DESCRIPTION OF THE DRAWINGS

In the following description, the invention will be explained more in detail by means of preferred embodiments thereof, namely for the manufacture of pent roof covering plates of concrete, with reference to the drawings wherein:

FIG. 1 shows in perspective view a portion of a complete apparatus for the manufacture of pent roof covering plates. In FIG. 1, this portion comprises the apparatus of the invention 1 comprising a filling station 20, a first compacting station 40, a second compacting station 60, an additional compacting station 70, a depositing station 78 and a cutting station 79. In order to make the conveyor device or driving unit 10 better visible, some pallets 7, 7′ and pallet supports 6 have been omitted at the entry zone 2.

Figure 1:
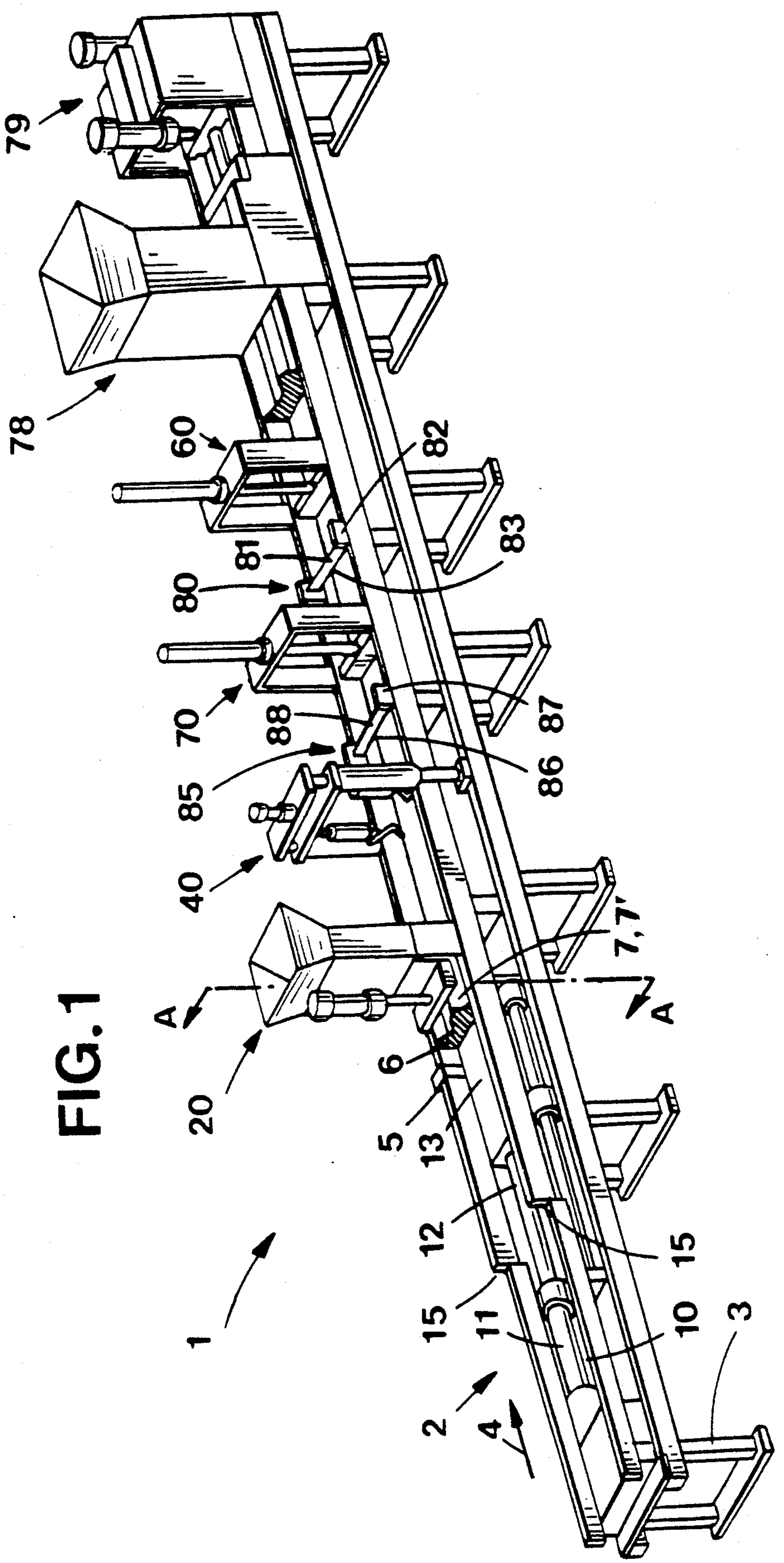
FIG. 1 shows in perspective view a portion of an apparatus according to the invention.

The pallets 7, 7′ for the manufacture of pent roof plates 90, 90′ (see FIG. 8 and 9) are laid upon supports 6 which circulate in a continuous row, at the infeed zone 2. The supports, driven by the driving unit 10, convey the pallets in the travelling direction 4 through the working stations fixed to the frame 3 of the apparatus 1, namely the filling station 20, the first compacting station 40, a stripper device 85, the additional compacting station 70, another stripper device 80, the second compacting station 60, the depositing station 78 and the cutting station 79.

The driving unit 10 comprises a horizontally working piston-cylinder engine with a cylinder 11 and a piston 12 connected to an advance traveller 13. The advance traveller 13 is in contact with a pallet support 6. The remainder of the construction of the driving unit 10 for the stepwise advancing of the pallets 7, 7' is described in German publication no. 29 45 553 mentioned above.

The frame 3 of the apparatus 1 comprises at least one detector 5 which senses during the advance motion of the pallet supports 6 with the laid-upon pallets 7, 7', the size of the cavity 8, 8' (shown in FIG. 2), and it supplies a signal to the individual working stations.

The pallet supports 6 with the laid-upon pallets 7, 7' are guided during their travel through the apparatus 1, by pallet guides 15 to be further explained with reference to FIG. 3.

Figure 2:
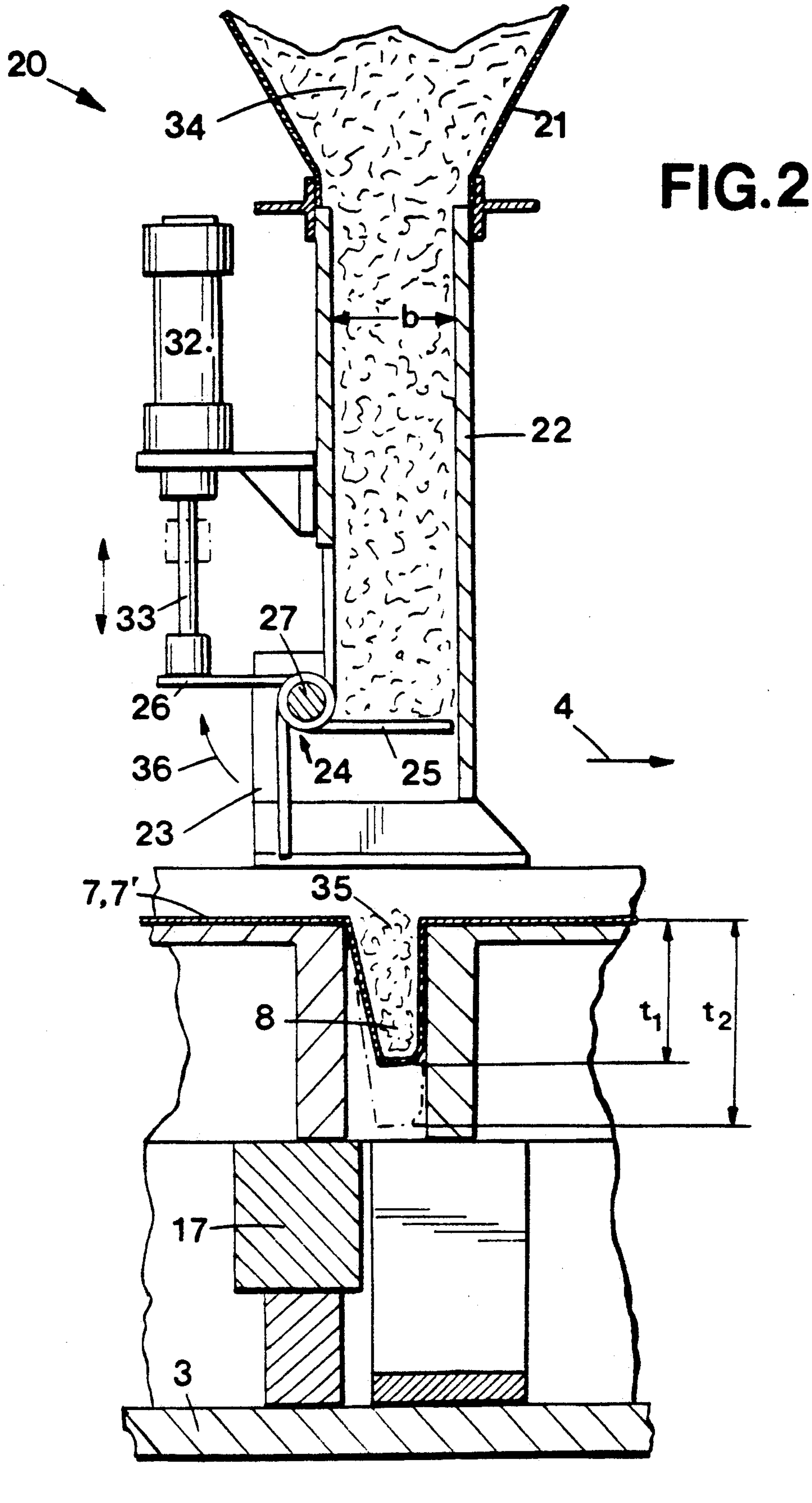
FIG. 2 is a sectional view of the filling station in a plane along the line A—A in FIG. 1.
Figure 3:
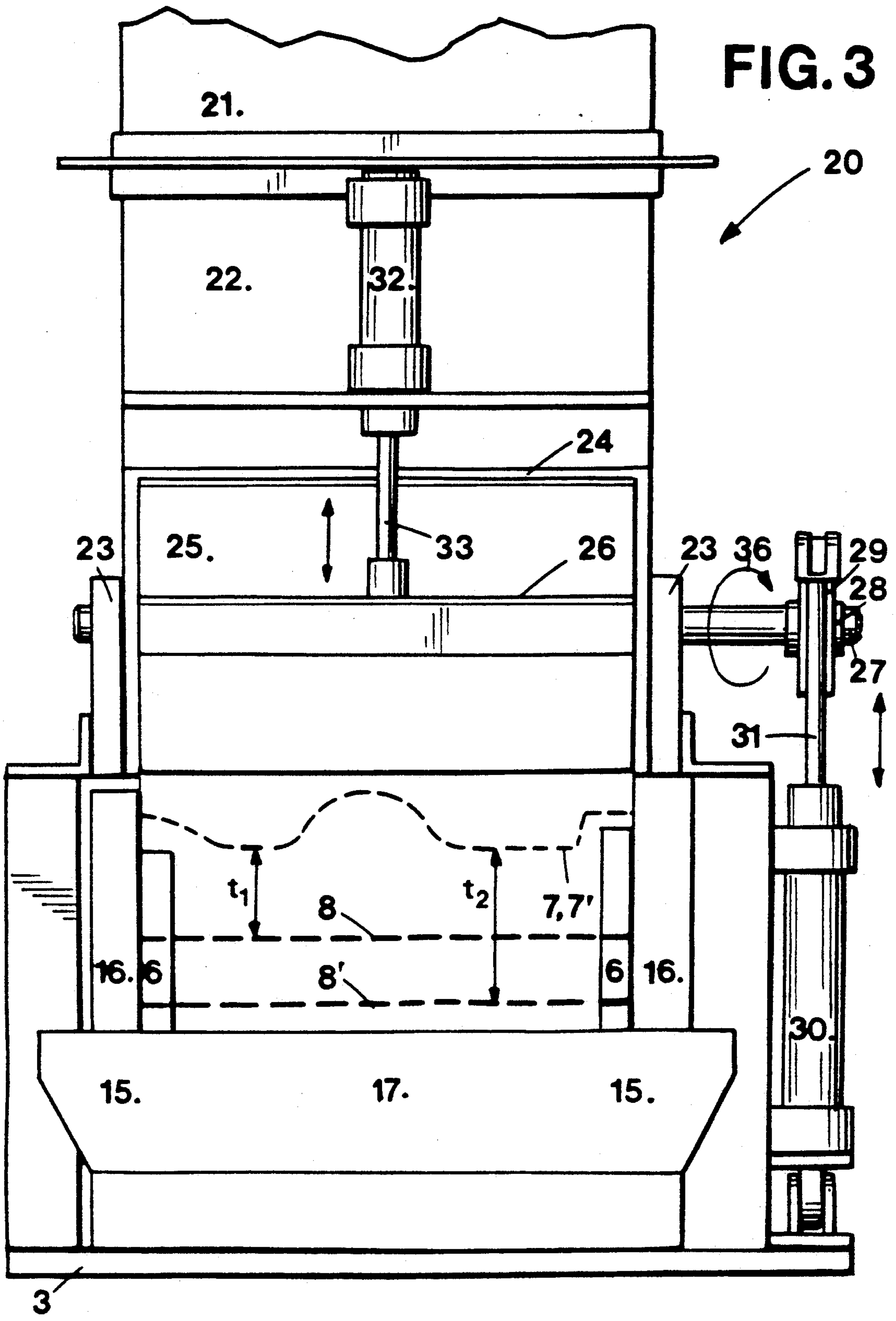
FIG. 3 is a front view of the filling station of the apparatus of FIG. 1.

The filling station 20, shown in FIG. 2 and 3, is rigidly mounted on the frame 3 and comprises a supply funnel 21, a supply box 22, a rotatably mounted star feeder 24 having a plurality of wings 25, a first pneumatic piston-cylinder unit 31, 30 and a second pneumatic piston-cylinder unit, each comprising corresponding fixations and rods.

Figure 8:
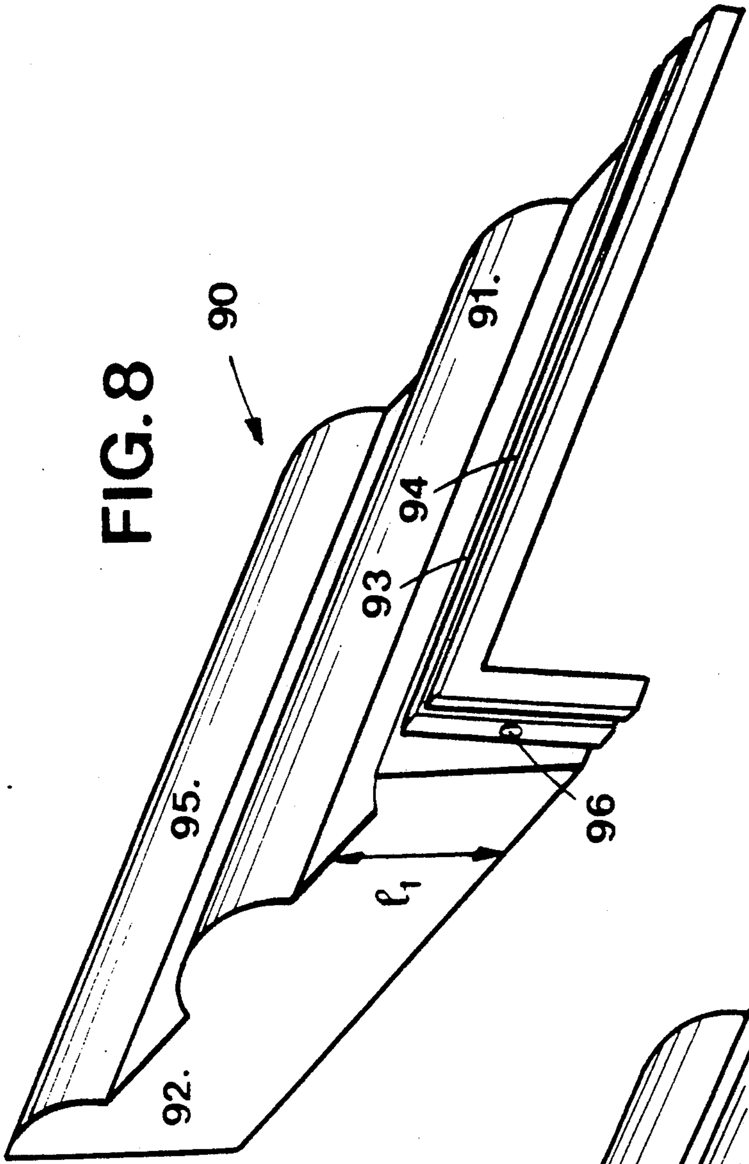
FIG. 8 is a perspective view of a pent roof terminal plate, having a short transverse flange, produced by the method and the apparatus of the invention.

The inner width b of the supply box 22 is selected so that the space between two successive wings 25 of the star feeder 24 corresponds to an amount of concrete 35 necessary for the formation of a short transverse flange 92 having the length $1_1$, shown in FIG. 8.

The star feeder 24 which has four wings in FIG. 2 comprises a through-going shaft 27 journalled with a free-wheel device 28 in bearing plates 23 secured to both sides of the supply box 22. The star feeder 24 is stepwise rotated by the cylinder 30 (shown in FIG. 3 only) which is pivotally connected to the frame 3, and whose piston 31 engages the free-wheel device 28 via a lever 29. The free-wheel device 28 is fixed to the free end of the shaft 27 emerging from the supply box 22.

A further cylinder 32 is mounted aside the supply box 22 above the star feeder 24, and its piston 33 extends vertically to a wing 26 of the multiwing star feeder 24, which wing emerges horizontally from the supply box 22.

The supply box 22 of the depositing station 20 is supplied with hardenable plastic material, with concrete 34 in this example, for the manufacture of the transverse flanges 92, 92' (see FIG. 8 and 9) of the pent roof plates 90, 90', by a conveying belt (not shown), arranged above the apparatus 1.

The four-wing star feeder 24 is rotated in the direction 36 on extension of the piston 31 of the cylinder 30 by 90° since the free-wheeling device 28 on the shaft 27 blocks the rotation 36 and therefore drives the shaft 27. On retracting the piston 31, the free-wheeling 28 is free so that shaft 27 is not rotated.

In order to provide an exact rotation of the four-wing star feeder 24 by 90°, a wing 26 which protrudes, after rotation, horizontally from the supply box 22, contacts the piston 33 of the cylinder 32 which has been extended down to act as a stop block. The retracted position of piston 33 is shown in FIG. 2 in dashed lines.

During the rotation of the four-wing star feeder 24 by 90°, the amount 35 of concrete, necessary to form a short transverse flange 92 shown in FIG. 8, having the length $1_1$, is deposited on the pallet 7 in the region of the cavity 8.

If the detector 5 shown in FIG. 1 detects a pallet 7' having a cavity 8' to form a transverse flange 92' (FIG. 9) having a greater length $1_2$, cylinder 30 is caused to rotate the four-wing star feeder twice by 90° so that twice the amount of concrete is deposited into the cavity 8' for the long transverse flange 92'. The cavity 8' having the depth $t_2$ for the long transverse flange 92' is shown in FIG. 2 and 3 by the lower, dashed line. The cavity 8 having the depth $t_1$ for a short transverse flange 92 is shown in FIG. 2 and indicated in FIG. 3 by the upper dashed line.

As it can be seen from FIG. 2 and FIG. 3, the pallet 7, 7' is at rest on a pallet support 6, guided by the vertical guide beads 16 and on the horizontal supporting girders 17 of the pallet guide 15, and is advanced in travelling direction 4.

Figure 4:
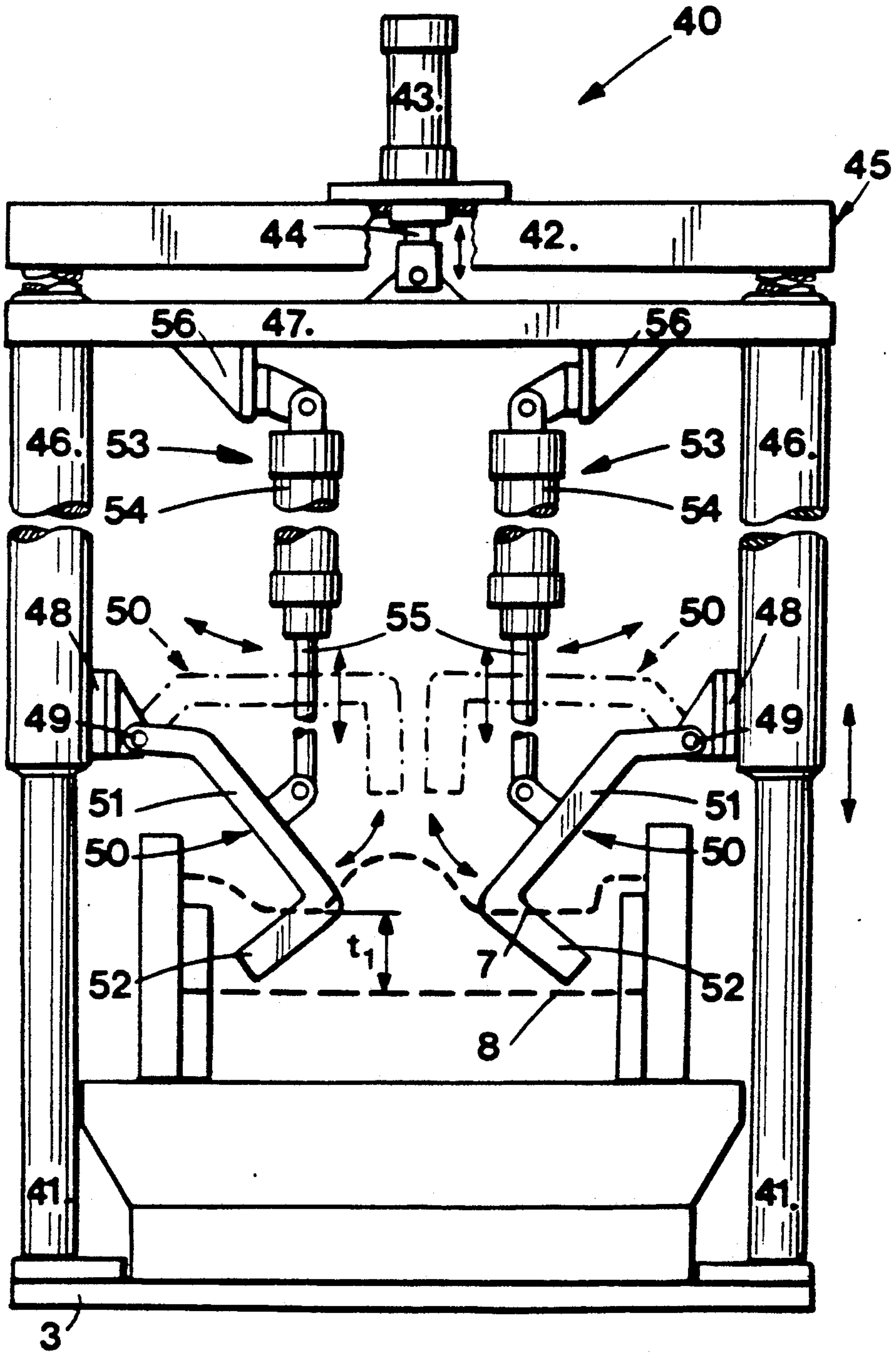
FIG. 4 is a front view of a first compacting station of the apparatus of FIG. 1, adjusted to produce a transverse flange of normal length.
Figure 5:
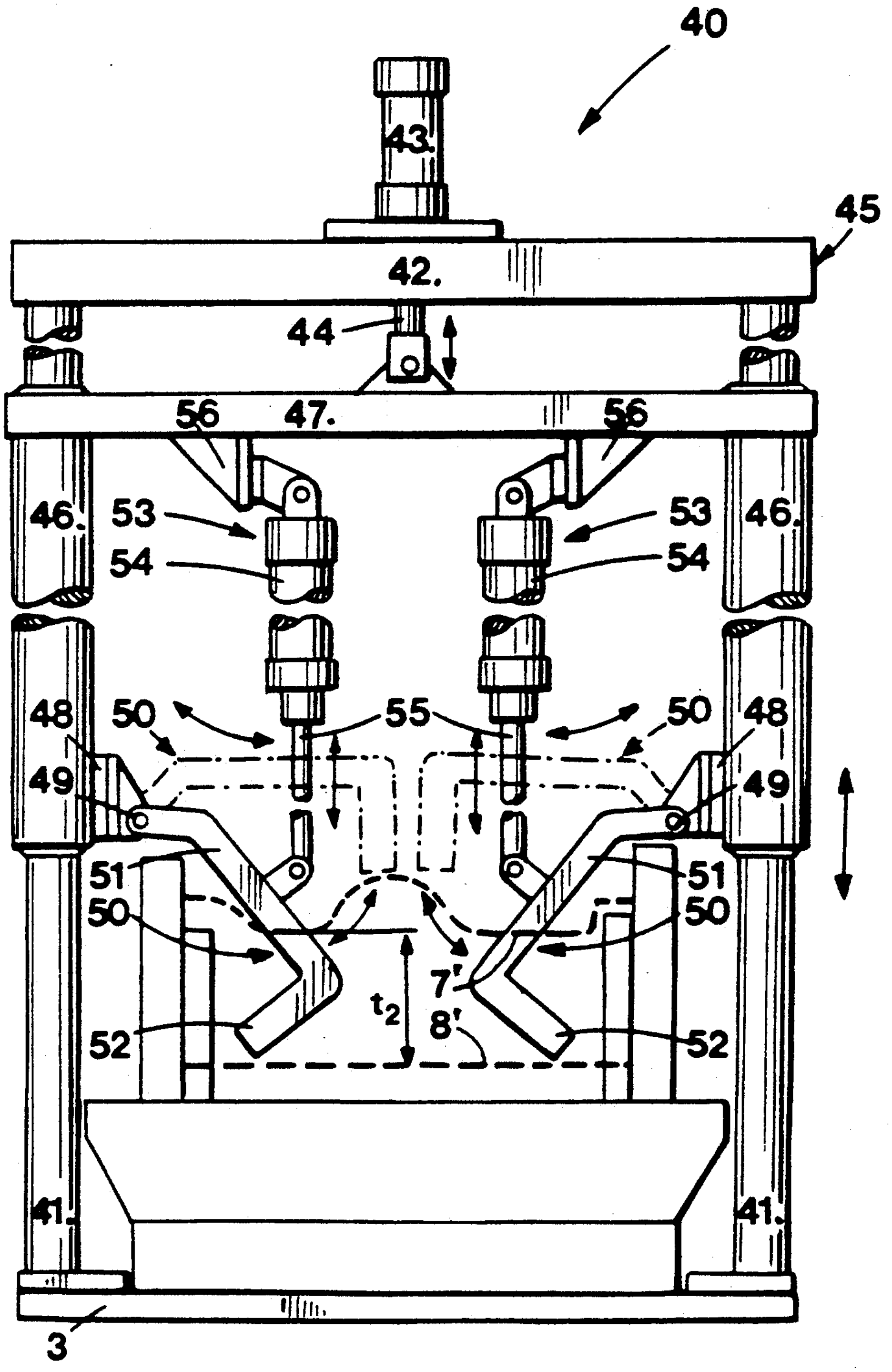
FIG. 5 shows the first compacting station of FIG. 4 but adjusted to produce a longer transverse flange.

The first compacting station 40, shown in FIG. 4 and 5, is secured to the frame 3 of the apparatus 1 by guide columns 42. The upper ends of the guide columns are connected by a transverse girder 42.

A height adjustable section 45 of the corner compacting station 40 is vertically displaceably supported by the guide columns 41. Support is provided by the guide sleeves 46 sliding over the guide columns 41, and the adjustable section 45 is secured thereto. The guide sleeves 46 are connected together at their upper ends, directed away from the frame 3, by a lift beam 47 engaged by the piston 44 of a lifting cylinder 43 mounted on the transverse girder 42.

A bearing 48 is mounted near the lower end on each of the guide sleeves 46 wherein a compacting tool 50 is journalled for an up-and-down rocking motion. A pair of vertically working drive means 53 is provided for a rocking drive of these compacting tools 50, and the cylinder 54 of the drive means is journalled for a lateral movement in brackets 56 rigidly fixed to the lift beam 47. Each compacting tool 50 essentially comprises an angular arrangement of a pusher 52 on an angled or bent leg 51. The leg 51 is journalled at its free end pivotably about the axis 49 in the bearing 48. The piston rod of the drive means 53 engages the tool at about the mid-portion of the leg 51.

When the cavity 8, 8' of the pallet 7, 7' will have been charged with the necessary amount of concrete 35, as explained above with reference to FIG. 2 and 3, and the pallet has been fed to the first compacting station 40, the compacting tools 50 are now introduced into the cavity 8, 8'. Each piston 55 is moved out of its cylinder 54, and the compacting tools 50 are rotated on a circle around the fulcrum 49 into the cavity 8, 8' of the pallet. During this motion, at least the pusher 52 of the compacting tool 50 is forced into the plastic material or concrete 35 within the cavity 8, 8', and it pushed the material like a die into the adjacent, lower corner of the cavity 8, 8'. In this manner, a predetermined compacting of the concrete 35 within the corresponding lower corner region of the cavity 8, 8' is obtained. On finishing of the compacting, the compacting tools are withdrawn to their rest position by retracting the pistons 55 into their cylinders. This rest position of the compacting tools is shown in FIG. 4 and 5 in dashed lines.

When the detector 5 has sensed a pallet 7 having a cavity 8 of the depth $t_1$, corresponding to a short transverse flange 92 shown in FIG. 8, the adjustable part 45 of the first compacting station 40 is brought by the lifting cylinder 43 into the upper position shown in FIG. 4 when the pallet 7 enters the station. When the detector 5 has sensed a pallet 7' having a cavity 8' of the depth $t_2$, corresponding to a long transverse flange 92' shown in FIG. 9, the adjustable part 45 of the first compacting station 40 is brought by the lifting cylinder 43 into the lower position shown in FIG. 5 when the pallet 7' enters the station. The pallet 7, 7' is shown by dashed lines in FIG. 4 and 5.

Figure 6:
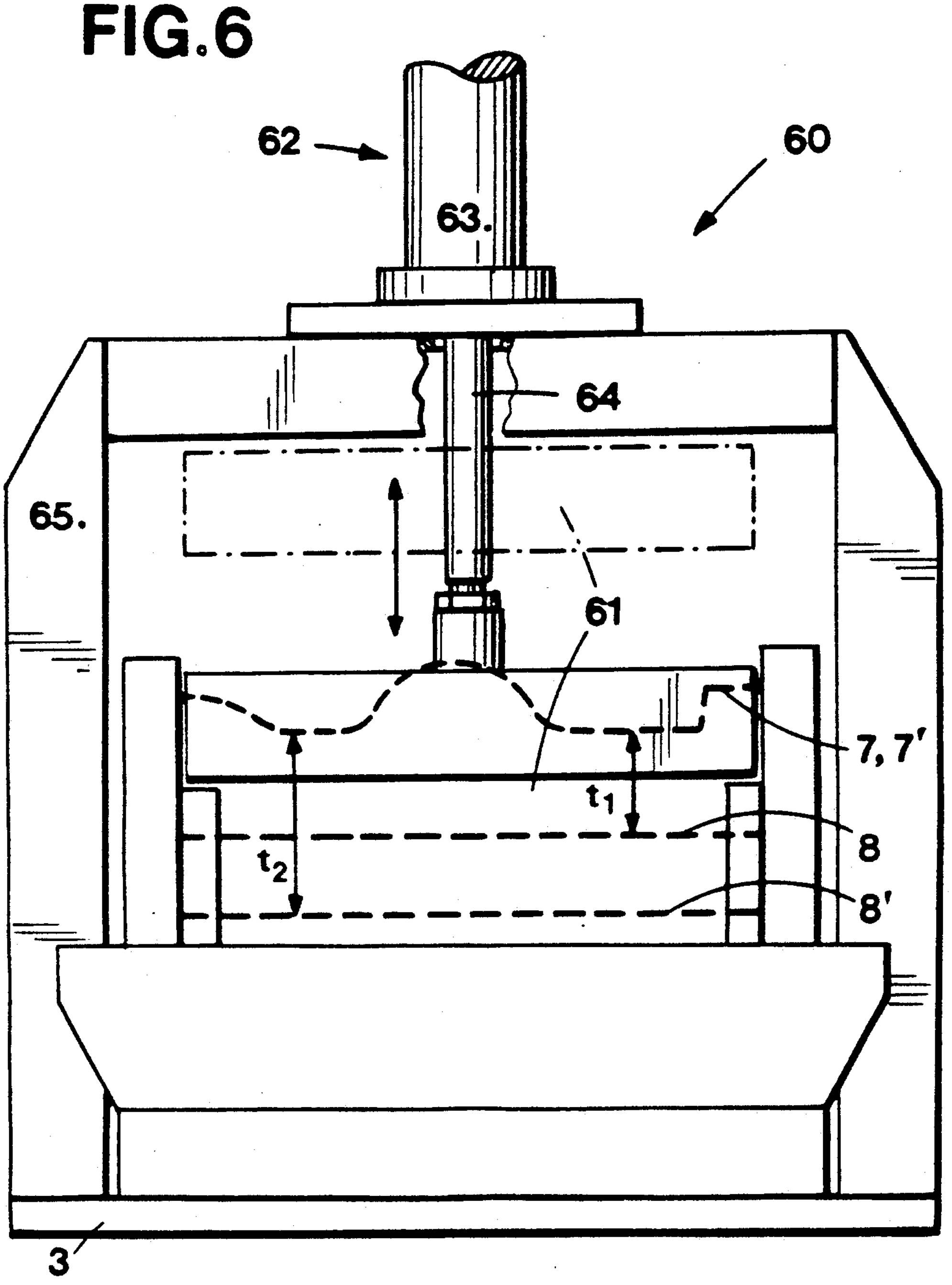
FIG. 6 is a front view of a second compacting station of the apparatus of FIG. 1.

A second compacting station 60, shown in FIG. 6, is secured by a mounting 65 to the machine frame 3 of the apparatus 1. A vertically working control device 62 is mounted to the upper transverse beam of the mounting 65. An oblong compacting tool 61 is fixed, transversely to the travel direction 4 of the pallets, to a piston rod of the piston 64 of the cylinder 63 belonging to the control device 62, and can be vertically reciprocated by the control device 62. Preferably, the compacting tool 61 is sized and shaped such as to correspond to the inner dimensions of the section of a cavity 8, 8′ so that the compacting tool 61, on lowering of the piston 64 into the cavity 8, 8′ of the pallet 7, 7′ now arrived at the second compacting station, can enter the cavity and compact the plastic material (concrete).

The pallet 7, 7′ is schematically indicated in dashed lines.

When the cavity 8, 8′ of the pallet 7, 7′ has taken a position below the compacting tool 61 of the second compacting station 60, the tool 61 is caused to enter the cavity 8, 8′ by the extension of the piston 64 from the cylinder 63, bringing necessarily about an overall surface compacting of the material within the cavity 8, 8′. At the end of the compacting work, the compacting tool 61 is withdrawn from the cavity 8, 8′ and transferred into its rest position, indicated by dashed lines, by the retraction of the piston 64 into the cylinder 63.

Figure 7:
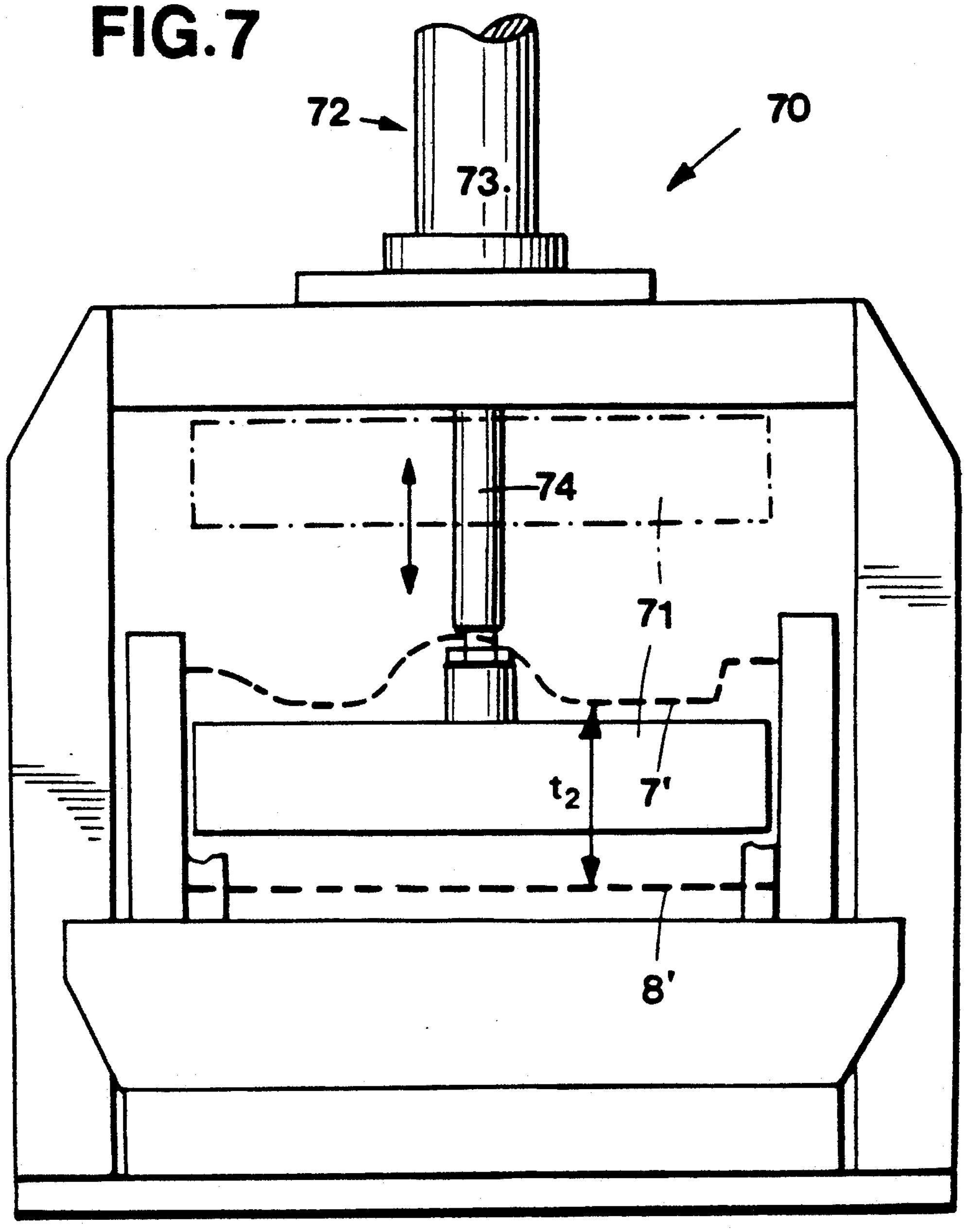
FIG. 7 is a front view of an additional compacting station of the apparatus of FIG. 1.
Figure 9:
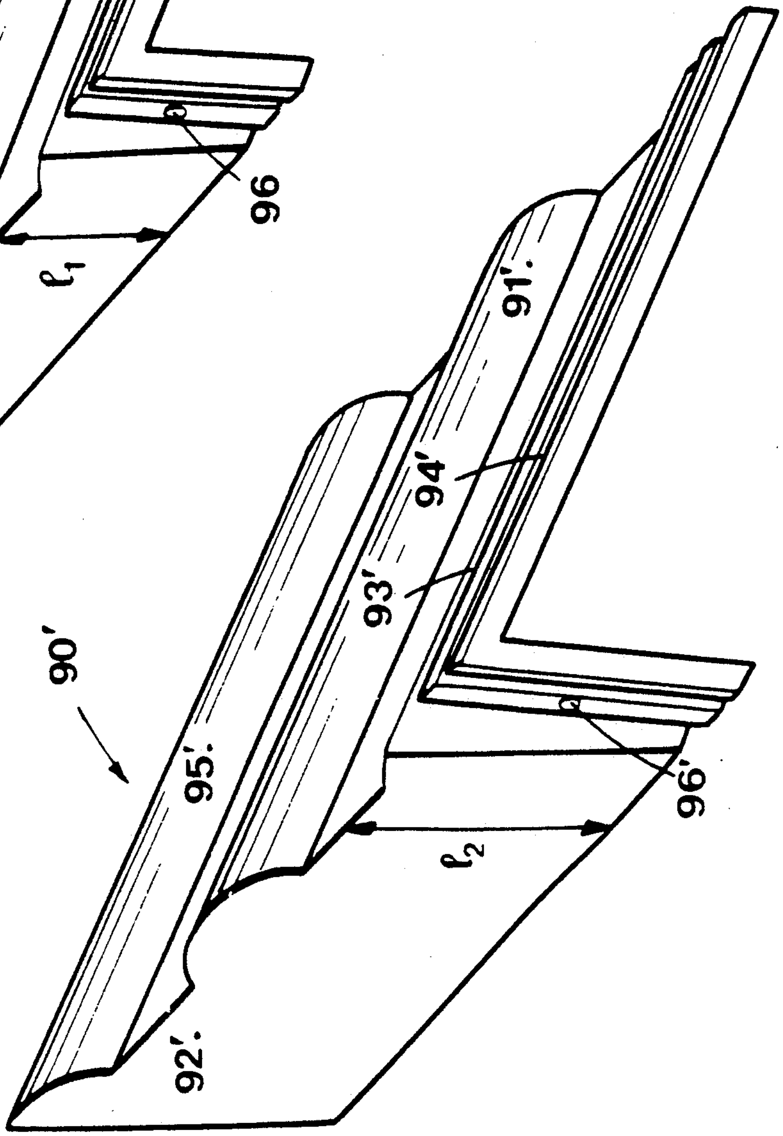
FIG. 9 is a perspective view of a pent roof terminal plate having a longer transverse flange, produced by the method and the apparatus of the invention.

When a longer transverse flange is to be made —corresponding to the longer transverse flange 92′ of the plate 90′ in FIG. 9—, an additional precompacting may be appropriate which is carried out after the corner compacting at the station 40 and the overall surface compacting at the station 60. For this purpose, an optionally actuated additional compacting station 70 is preferred, shown in FIG. 7. This additional compacting station 70 can be arranged in the same manner as the second compacting station, described above with reference to FIG. 6.

When the detector 5 senses the presence of a pallet 7 whose cavity 8 has a depth $t_1$, the additional compacting station 70 is not activated. The pallet 7 passes through this additional compacting station 70 without the compacting tool 71 carrying out a compacting work. However, when the detector 5 senses a pallet 7′ whose cavity 8′ has a depth $t_2$, the additional compacting station 70 is activated. When the respective pallet 7′ has entered the additional compacting station 70, its compacting tool 71 is made to enter the cavity 8′, by the action of the control device 72 comprising the piston-cylinder unit 74, 73, and precompacts the plastic material. In the following second compacting station 60, the compacting tool 61 is actuated to carry out the final compacting, see FIG. 6.

When the compacting tool 61 of the second compacting station 60 has arrived at its upper position, see FIG. 6, the plastic material in a greater cavity 8′ having a depth $t_2$, as well as in a smaller cavity 8 having a depth $t_1$, has been sufficiently compacted.

As it is shown in FIG. 1, a stripper device 80 is provided upstream to the second compacting station 60. Such a stripper device 80 comprises a stripper blade 81 fixed by brackets 82 to the frame 3 of the apparatus 1. The lower edge of the blade 81 is arranged as a stripper or scraper edge 83 whose profile is adapted to the profile of the upper surface of a pallet 7, 7′. The stripper edge 83 of the blade 81 slides over the upper surface of the pallet 7, 7′ and shovels any concrete which has been displaced during precompacting and compacting at the stations 60 and 70 from the cavity 8, 8′ onto the upper face of the pallet 7, 7′, back into the cavity, during the travel of the pallet through the stripper device 80.

A further stripper device 85 is provided upstream to the first compacting station. This further stripper device 85 is identical to the first stripper device 80 already described. A stripper blade 86 is fixed by brackets 87 to the frame 3 of the apparatus 1. The stripper edge 88 snugly slides over the upper face of the pallet 7, 7′ on its travel from the first compacting station 40 to the additional compacting station 70. The blade 86 transfers any concrete displaced during the corner compacting at the first compacting station 40 out of the cavity 8, 8′ onto the upper surface of the pallet 7, 7′, back into the cavity 8, 8′ as well as any concrete directly deposited on the pallet 7, 7′ in the filling station 20.

When the plastic material (concrete) within the cavity 8, 8′ of a pallet 7, 7′ has sufficiently been compacted at the second compacting station 60, a continuous layer of fresh concrete is deposited on that pallet at the depositing station 78. This is achieved typically by the known extrusion method for the manufacture of concrete roofing plates. The depositing station typically comprises a shaping roller (not shown) and a slipper (not shown either). Under the contact pressure of shaping roller and slipper, the material layer is pressed to the material already present in the cavity 8, 8′ to form a complete roofing plate.

The depositing station 78 is followed, in a manner known per se, by a cutting station 79 and a drier (not shown). The construction and operation of the depositing station 78, the cutting station 79 and the drier are known to the one skilled in the art; reference is made, e.g., to DE-A-22 52 047 and/or DE-A-35 22 846.

FIG. 8 shows in a schematical, perspective view a pent roof terminal plate 90 of concrete, made by the process and in the apparatus of the invention. The plate 90 comprises a body 91 and a short transverse flange 92 having the length $l_1$. The flange 92 extends over the entire width of the plate body 91 and typically has a length $l_1$ of about 73 to 83 mm, taken from the upper surface of the plate body 91.

Correspondingly, FIG. 9 shows in a schematical, perspective view a pent roof terminal plate 90′ of concrete, made by the process and in the apparatus of the invention. The plate 90′ comprises a body 91′ and a long transverse flange 92′ having the length $l_2$, for special requirements, for example for extremely steep pent roofs. In this case, the transverse flange may have a length $l_2$ of about 115 to 125 mm, taken from the upper surface of the plate body 91′.

The transverse flanges 92, 92, have a tapered section. The thickness of the flanges 92, 92′ at the upper end thereof, i.e. at the underside of the plate body 91, 91′, is about 45 to 50 mm, and about 23 to 28 mm, at their lower end. The material thickness of the plate body 91, 91′ is typically about 10 to 13 mm.

The transverse flange 92, 92′ is shaped to the head edge portion of a pent roof terminal plate 90, 90′ whose foot edge may be rounded or beveled, as described in detail in DE-A-35 22 846. The basic construction of a pent roof terminal plate is known from German patent DE-C-30 15 916. A covered border portion 93, 93′ having a lateral groove 94, 94′ and a covering border portion 95, 95′ having an an overlap groove (not shown) are provided at the plate body 91, 91′ as well as at the transverse flange 92, 92′, in order to accomplish an overlapping connection with the border portions of adjacent roofing plates. The transverse flange 92, 92' which extends at about a right angle from the underside of the plate body 91, 91', and which is shaped to the head portion of the body 91, 91', comprises an opening 96, 96' for receiving a fixation means (not shown), such as screw, nail, or similar.

We claim:

1. In a process for the manufacture of roof covering plates having at their underside a transverse flange, comprising depositing hardenable plastic material on a plurality of pallets, each pallet of said plurality defining a cavity having a shape for the formation of said transverse flange, said process further including the steps of:

introducing a first predetermined amount of said plastic material at a filling station into the cavity of each pallet and compacting it at at least one compacting station before feeding it to a material depositing station, depositing a continuous layer of said plastic material onto each pallet at said material depositing station, compacting said plastic material deposited on each of said pallets with a shaping roller and a slipper, cutting the compacted material at a cutting station into roofing plates, and hardening and separating said roofing plates from said pallets, the improvement comprising:

compacting said first predetermined amount of said plastic material at said at least one compacting station by a directed compacting movement towards the corners of the cavity of each pallet of said plurality of pallets before further compaction of said first amount of said plastic material across the whole width of the cavity of each pallet of said plurality of pallets at at least a second compacting station and forming a first compaction in the lower corners of the cavity of each pallet of said plurality of pallets.

2. The process of claim 1 wherein pallets having cavities of different depths are used for the manufacture of roofing plates having transverse flanges of different lengths, including determining the size of each pallet with one or more sense detectors, and metering a corresponding amount of plastic material into said cavities in response to signals from said detector or detectors.

3. The process of claim 1, wherein any material deposited on each pallet beside the cavity thereof, is transferred into said cavity by a stripper device before each pallet enters the second compacting station.

4. The process of claim 3, wherein the remainder of the material in each cavity is pre-compacted at an additional compacting station after the compacting of the material in the lower corners of each cavity, when pallets having cavities of different depths are used.

5. The process of claim 4, wherein any material deposited on each pallet beside the cavity thereof, is transferred into each cavity by a further stripper device before each pallet enters the additional compacting station.

6. In an apparatus for the manufacture of roof covering plates having at their underside a transverse flange, comprising a filling station for receiving a continuous row of a plurality of displaceable empty pallets driven by a conveyor, said pallets defining a cavity having a shape for the formation of said transverse flange, and for introducing a predetermined amount of plastic material into the cavity of each pallet, at least one compacting station for receiving the pallets coming from said filling station comprising at least one compacting tool adapted to the advance motion of said pallets and to be reciprocated into the cavity of each pallet at said compacting station for compacting said predetermined amount of plastic material in said cavity, depositing station including means for displacing said row of pallets thereto and supplying a further plastic material in a continuous layer onto said pallets, a shaping roller and a slipper for compacting and profiling said layer continuously advancing thereunder, and a cutting station for cutting the continuous, compacted layer into individual roofing plate moldings, the improvement comprising providing a further compacting station having two compacting tools arranged to compact by a directed compacting movement towards the corners of the cavity of each pallet of the plurality of pallets, the predetermined amount of plastic material situated in the lower corners of the cavity of each pallet of the plurality of pallets.

7. The apparatus of claim 6 including a rotatable, multi-wing star feeder located at the filling station, said star feeder being adapted to introduce, by stepwise rotation, a predetermined amount of plastic material into the cavity of each pallet supplied to said filling station.

8. The apparatus of claim 6 including pneumatic or hydraulic piston-cylinder units as actuating means for the compacting tools.

9. The apparatus of claim 6 including pallets which have cavities of different sizes.

10. The apparatus of claim 6 including at least one detector located adjacent to the conveyor path of the pallets and which is adapted to sense the size of the cavity of each pallet and to transmit generated detector signals to the filling station and to one or more of the compacting station.

11. The apparatus of claim 6 wherein the conveyor is adapted for a stepwise advance motion of the pallets and essentially comprises a reversible pneumatic or hydraulic piston-cylinder unit arranged to displace an advance traveller engaging said pallets for a predetermined distance along the travelling direction.

12. The apparatus of claim 11, wherein the filling station and the compacting stations are operable at standstill times of the pallets.

13. The apparatus of claim 6, wherein each compacting tool comprises a pusher adapted to be moved towards one lower corner of each cavity of the plurality of pallets on a partial circular path, by the motion of a leg connected thereto in an angled or bentoff configuration and pivotally journalled with its free end in the first compacting station.

14. The apparatus of claim 13, wherein the free end of each of the legs of each compacting tool is adjustably connected at different heights to the first compacting station.

15. The apparatus of claim 6 including a second compacting station comprising an oblong compacting tool aligned across the travelling direction of the pallets and shaped to substantially fill out the section of the cavity of each pallet of the plurality of pallets.

16. The apparatus of claim 15, including a stripper device located before the second compacting station in the travelling direction of the pallets, which stripper device comprises stripper edges substantially aligned with the upper surface of each pallet of the plurality of pallets.

17. The apparatus of claim 16, including an additional compacting station located between the first compacting station and the stripper device and said stripper device is adapted to be actuated when appropriate and work as a pre-compacting means, said additional compacting station comprising an oblong compacting tool aligned across the travelling direction of said pallets and shaped to substantially fill out the section of the cavity of each pallet of the plurality of pallets.

18. The apparatus of claim 17 including a further stripper device located before the additional compacting station in the travelling direction of the pallets said further stripping device comprising stripper edges substantially aligned with the upper surface of each pallet of the plurality of pallets.

* * * * *